United States Patent [19]

Hall, Sr.

[11] 3,883,090

[45] May 13, 1975

[54] DRIVE FOR MAGNETIC RECORDING DISC OR TAPE CASSETTES

[75] Inventor: Robert P. Hall, Sr., Auburn, Calif.

[73] Assignee: Arvin Industries, Inc., Columbus, Ind.

[22] Filed: Apr. 24, 1972

[21] Appl. No.: 246,636

[52] U.S. Cl. .................. 242/199; 192/46; 242/203; 360/97

[51] Int. Cl. .......................................... G11b 23/10

[58] Field of Search ........... 242/199, 200, 198, 197, 242/194, 201, 202, 203, 205, 207, 210, 68.3; 274/4 C, 4 B, 11 C, 11 B; 179/100.2 Z, 100.2 ZA; 192/67 R, 46

[56] References Cited

UNITED STATES PATENTS

| | | | |
|---|---|---|---|
| 1,849,212 | 3/1932 | Winther | 192/46 |
| 3,111,282 | 11/1963 | Proctor | 242/200 |
| 3,285,613 | 11/1966 | Hallamore | 274/4 C |
| 3,558,027 | 1/1971 | Jullien-Davin | 179/100.2 Z X |
| 3,623,679 | 11/1971 | Neudecker et al. | 242/194 |

FOREIGN PATENTS OR APPLICATIONS

| | | | |
|---|---|---|---|
| 1,200,572 | 7/1970 | United Kingdom | 242/197 |

*Primary Examiner*—George F. Mautz

[57] ABSTRACT

A cassette containing a magnetic recording media has a rotatably mounted hub connected to the media and provided with at least one face having a plurality of circularly arranged radially extending and axially facing undercut teeth. A complementary drive hub is provided in a deck to receive the cassette. The drive and driven hubs are brought into engagement, preferably by interacting alignment members on the two hubs, and the complementary undercut teeth cause the two hubs to mesh for positive driving engagement in one direction. The hubs are capable of overrunning in the opposite direction of rotation.

5 Claims, 7 Drawing Figures

DRIVE FOR MAGNETIC RECORDING DISC OR TAPE CASSETTES

CROSS REFERENCE TO RELATED APPLICATIONS

This application is related to copending applications Ser. No. 246,812, filed Apr. 24, 1972 and Ser. No. 266,582, filed June 21, 1972, now abandoned, both assigned to the assignee of this application.

BACKGROUND OF THE INVENTION

This invention relates to a magnetic recording tape or disc drive, for the purpose of magnetic recording and replay. The best known commercial magnetic tape handling systems employing a cassette or cartridge for the tape are the so-called Norelco cassettes, such as shown in U.S. Pat. No. 3,394,899, and the eight track cartridge system, such as shown in U.S. Pat. Nos. 3,478,973 and 3,482,792. In either of these systems the motive power to move the tape is supplied by a capstan cooperating with a pinch roll to nip the tape therebetween and move it forward past a magnetic transducer at a desired constant speed. The tape is then taken up on a takeup device which operates through a slip clutch, or in some other comparable fashion, to gather the tape in a roll after it passes the transducer and capstan.

In devices designed to operate with the cassette of the type shown in U.S. Pat. No. 3,394,899, it is customary to provide for a movement of the magnetic transducer toward and away from the cassette in order to bring the transducer into and out of contact with the tape. The capstan in those devices inserts through an aperture in the cassette behind the tape, and a pinch roll moves with the transducer, pushing the tape into engagement with the capstan as the transducer is brought forward to its operative position. The takeup and supply hubs have open centers with inwardly extending teeth. They fit over spindles having outwardly facing teeth, either by placing the cassette over the spindles, or having the spindles retract and extend in some manner.

In the so-called endless tape cartridge such as shown in U.S. Pat. No. 3,482,792, the pinch roller is incorporated as a part of the cassette or cartridge, and the entire cartridge is moved forward against the transducer and the pinch roll, with the transducer entering an opening in one end of the cassette, against the pinch roll. The tape is taken from the interior of a roll and feed back to its exterior, with a free length in between which accommodates any differences in speed between supply and takeup.

In magnetic disc recording systems, rigid discs having a relatively hard magnetizable coating have been used, and ordinarily and disc is fastened to a rotating drive spindle. Where flexible discs have been proposed, they have been attached to a rigid platter-like base. In either case the recording discs have not been readily interchangeable.

SUMMARY OF THE INVENTION

The present invention provides a novel drive for magnetic recording cassettes which contain a disc or a length of tape, which is of simplified mechanical construction and arrangement utilizing a clutch device that engages and disengages with a minimum of relative movement between the clutch parts, and uses parts that are mass producable.

The primary object of the invention, therefore, is to provide a novel drive arrangement for use in magnetic recording cassettes, using either a disc or a length of tape, wherein a hub connected to the recording media is rotatably mounted in one face of the cassette, preferably flush therewith, and provided with a plurality of circularly arranged radially extending and axially facing teeth which are undercut in one direction, together with a motor driven drive hub which has a face generally complementary to the driven hub and capable of firm engagement therewith once the faces of the two hubs are placed in face to face contact such that the undercut teeth can then mesh completely; to provide such an arrangement which enables the engagement of the drive for the recording media in a cassette with a minimum of relative movement between the drive hub and the cassette; and to provide such a drive arrangement together with interacting locating means on the drive and driven hubs to align the toothed faces of the hubs for proper engagement.

Other objects and advantages of the invention will be apparent from the following description, the accompanying drawings and the appended claims.

DESCRIPTION OF THE PREFERRED EMBODIMENT

Figure 1:
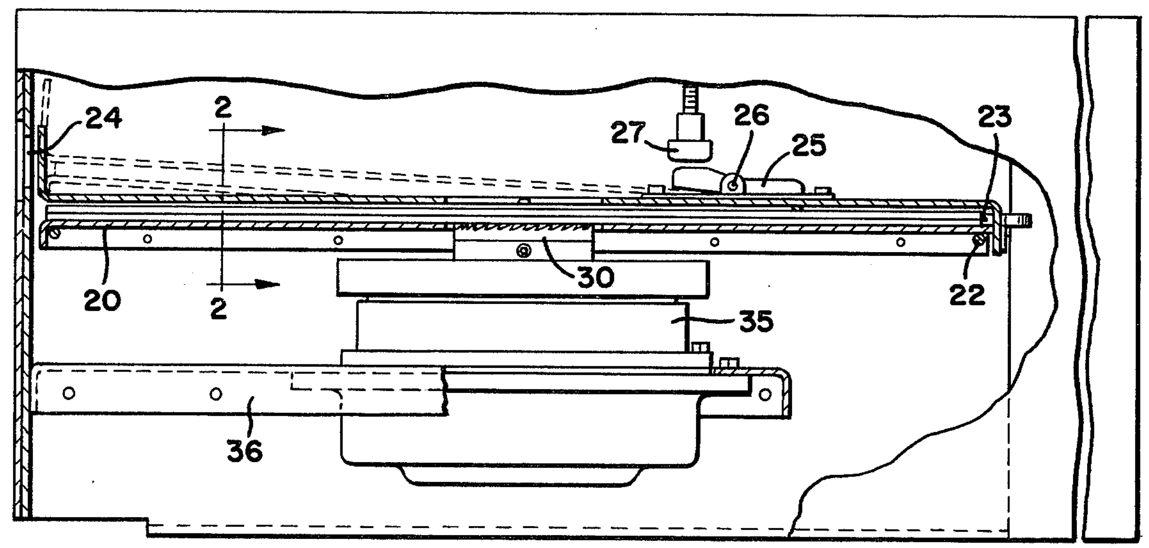
FIG. 1 is a side view partially broken away and shown in section, illustrating the invention as applied to a magnetic disc cassette drive.

FIGS. 1–4 show the inventions as applied to a magnetic disc recording device in which a thin flexible recording media in the form of a disc is contained within a cassette 10 having a central opening 11 surrounding the driven hub 12. This hub has at least one, and in some cases both, of its faces 14 and 14*a* provided with a plurality of circularly arranged radially extending teeth 15 which face along the axis of rotation of the hub. Details of the hub structure, its attachment to the recording disc media, and the remainder of the cassette are fully disclosed in said copending application Ser. No. 266,582, filed June 27, 1972 and its continuation-in-part application Ser. No. 305,335, filed Nov. 10, 1972.

Figures 2, 3:
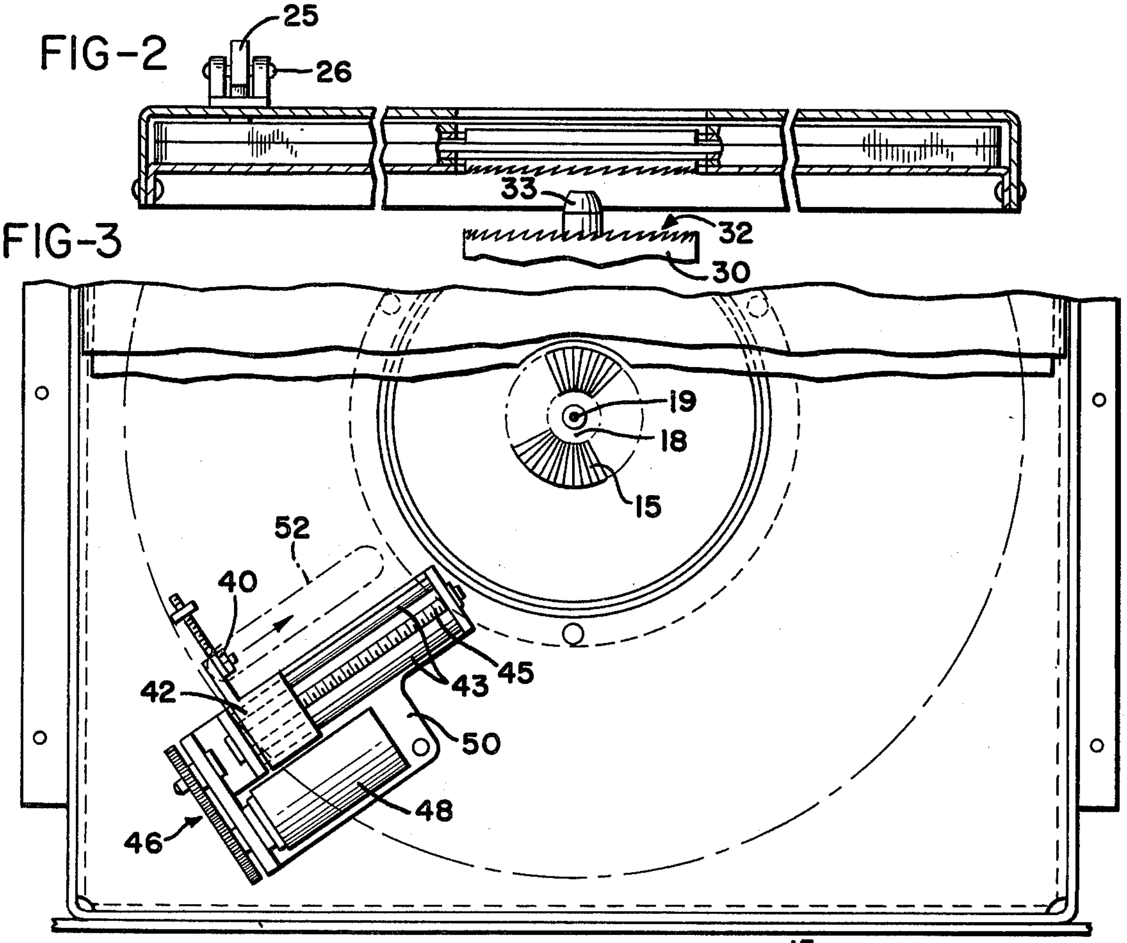
FIG. 2 is a cross-sectional view taken generally along line 2—2 in FIG. 1, but showing the hubs separated.
FIG. 3 is a partial plan view of the device shown in FIG. 1, with parts broken away to illustrate details of drive arrangement.
Figure 4:
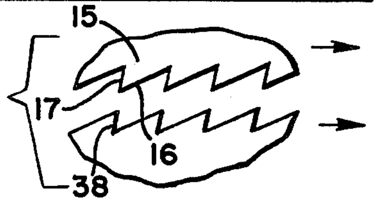
FIG. 4 is an enlarged fragmentary view showing portions of the drive and driven hubs and the tooth arrangement thereon.

As shown in FIG. 4, the hub teeth 15 each have a frontal face 16 which extends at an acute angle with respect to the plane of rotation of the hub, and a rearward or driven face 17 which extends at an obtuse angle of the same sign to the plane of rotation. In other words, the teeth 15 have a generally undercut configuration. The teeth extend from a free outer periphery, for example the outer edge of the hub as shown in FIGS. 2 and 3, to an inner recessed region 18, which may itself function as part of a locating arrangement, and may also include a central pilot or centering hole 19.

The hub structure is confined for rotation within the cassette, but its mounting and the fit of the cassette within the carriage 20, is such that a slight movement along the axis of rotation of the hub is possible during normal operation. In a typical deck arrangement, the carriage 20 is mounted to pivot around one edge, for example on a hinge rod 22, and in FIG. 1 the carriage is shown in a lowered or playing position in full lines, and the dotted lines show the raised or loading-unloading position of the carriage. In the latter position an ejection spring 23 tends to urge the cassette partially out of the carriage through the access opening 24. A cassette retaining latch 25 is pivotally mounted at 26 to the top of the carriage and spring loaded to the position shown in FIG. 1 whereby a tip of the latch member 25 passes through the upper wall of the carriage and engages a suitable notch within one face of the cassette. When the carriage is raised to its loading position, a stop 27 engages the latch member 25 and causes it to pivot, releasing the cassette. Thus, in the playing position the latch member 25 defines the location of the cassette within the carriage, against the force of the ejector spring 23.

The drive part of the deck, and particularly of the driving mechanism provided by the invention, comprises a drive hub 30 having a surface which is a complement of the driven hub 12. The drive hub thus includes a number of circularly arranged radially extending undercut teeth 32 which are adapted to engage the teeth 15. A pilot shaft or pin 33 extends from the drive hub into the pilot or centering hole 19 to bring the hubs 12 and 30 into proper alignment as their respective teeth are brought into face to face engagement.

The drive hub 30 is connected to the output shaft of a motor 35, which in turn is mounted upon a supporting shelf 36 within the housing of the deck, below the carriage 20. It should be observed, however, that the arrangement of the parts shown in FIGS. 1–3 is merely exemplary, and the invention is not limited to an arrangement where the motor and drive hub are located beneath the cassette and the parts to be driven. The arrangement can just as well be inverted, or with the cassette supported vertically and the drive motor having its axis of rotation horizontal.

When the drive and driven hubs are brought into engagement, the undercut tooth configuration functions to bring the hubs into a firm and positive driving engagement. The driven tooth faces 17 of the driven hub are engaged by corresponding driving faces 38 in the driven hub, and the resulting force components, since the hub 30 is tending to drive and the hub 12 is tending to resist, are such that the teeth move firmly into engagement in the direction of rotation. On the other hand, the drive mechanism will overrun should the motor suddenly be stopped for any reason, hence a firm forward drive is provided, with an automatic release of any drive force components in the opposite direction of rotation.

In the embodiment shown in FIGS. 1–3, a magnetic transducer 40 is mounted on an arm extending from a carrier block 42, which in turn is supported on rods 43 and movable by means of a lead screw 45. The lead screw is connected through gears 46 to a position motor, such as a stepping motor 48, and this entire assembly is carried on a supporting bracket 50 which mounts to the shelf 36 in a position where the transducer 40 is movable along a radius of the recording media within the cassette 10. An elongated access opening 52 is provided in the surface of the cassette, to allow the transducer to interface with the recording surface. The position control motor 48 can be operated in steps, causing the transducer to follow different circular tracks, or the motor can be operated in correlation with rotation of the disc to cause the transducer to follow a helical path along the active recording surface of the media disc.

Figure 5:
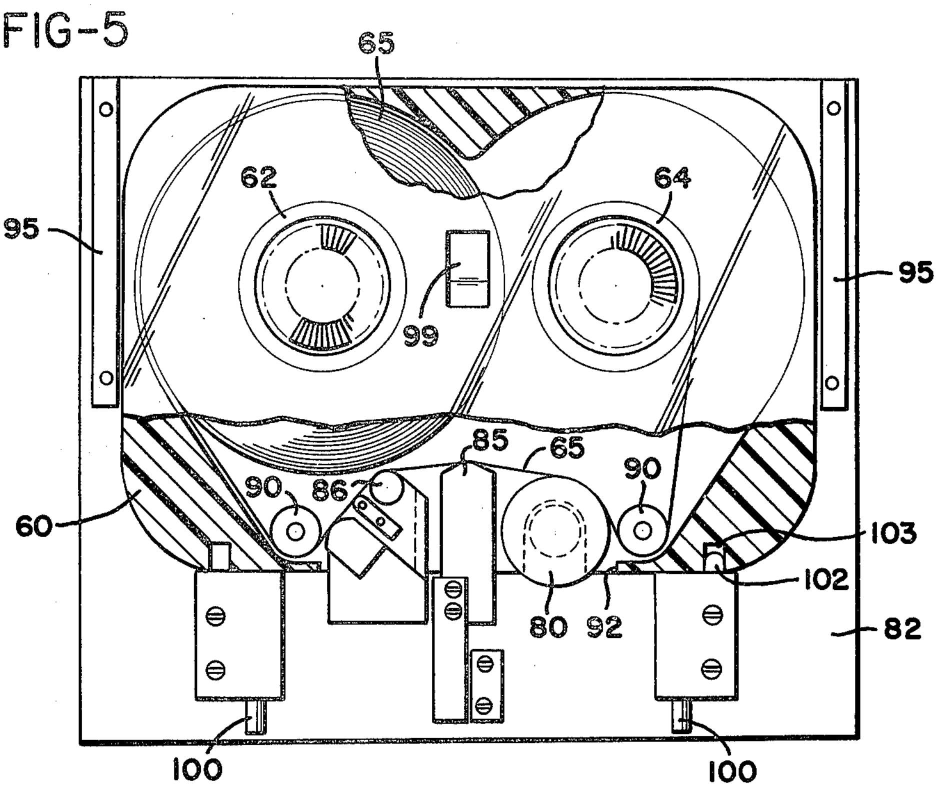
FIG. 5 is a plan view of a deck and tape cassette embodying the present invention.
Figure 6:
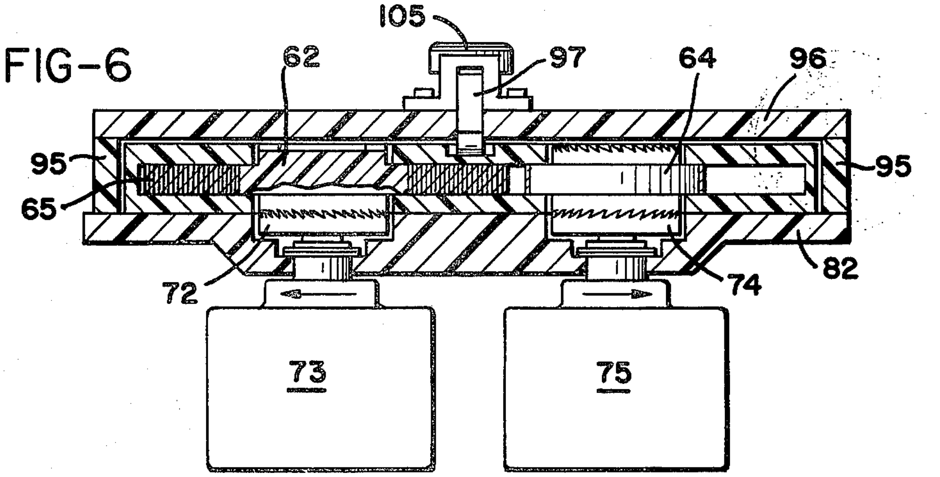
FIG. 6 is a cross-sectional view taken generally through the deck and cassette showing the drive arrangements as applied to the hubs for the tape rolls in the cassette.
Figure 7:
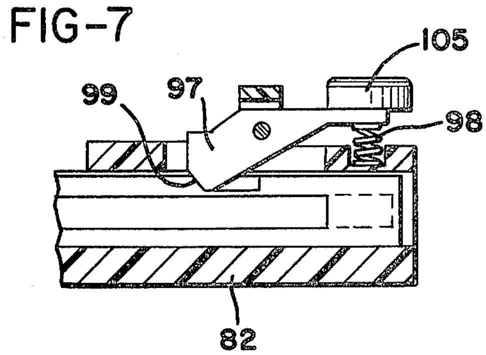
FIG. 7 is a detail view showing the retaining mechanism for holding the cassette in playing position.

Another embodiment of the invention is disclosed in FIGS. 5–7, in conjunction with a magnetic recording tape and cassette and deck as more particularly disclosed in copending application Ser. No. 246,812, filed Apr. 24, 1972. In this embodiment a cassette having a body 60 is provided with spaced apart hubs 62 and 64 connected to a quantity of magnetic recording tape 65. In FIGS. 5 and 6 the supply of tape is shown rolled on hub 62 and in position to be taken up on the hub 64. Each of the hubs 62 and 64 is provided with a toothed configuration extending outwardly to and accessible from the surface of the cassette body 60. The toothed configuration corresponds to the configuration of the driven hub 12 in FIG. 1, however in the cassette as shown in FIG. 6, the downwardly facing toothed surfaces of the respective hubs are arranged as follows.

Hub 62 has its teeth arranged for driving in a counterclockwise direction as viewed from below in FIG. 6, and this is the direction in which a driven hub 72 is rotated by a motor 73. The downwardly facing teeth of hub 64 are arranged for driving in a clockwise direction, as viewed from below by a driven hub 74 which in turn is rotated by a separate motor 75.

As shown in FIG. 5, a motor driven capstan 80 extends upwardly from the deck plate 82, and is arranged to enter a slot in one edge of the cassette body 60, and to have a portion of the tape 65 wrapped around the capstan surface. Motors 73 and 75 provide correlated opposing forces which maintain proper tension in the tape, and the motor driven capstan 80 provides the constant speed motive force to advance the tape past a transducer head 85. Upstream of the head, along the direction of tape movement, there is a precision mounted flanged tape guide roller 86 which aligns the tape with the transducer(s) in the head 85. The only other elements in the cassette, besides the hubs 62 and 64, are a pair of guiding spindles or rollers 90 located near opposite ends of the side access opening 92, to guide a length of tape past the opening where it can loop over the capstan, head, and precision guide roller, as shown in FIG. 5.

In a preferred embodiment the cassette is reversible, merely by removing and inverting it, with respect to the deck and the drive. Thus, the toothed configurations on the top of the cassette (as shown in FIGS. 5 and 6) are the reverse of the tooth configurations on the lower side of the cassette, in order to provide the desired positive drive in the appropriate direction when the cassette is inverted.

The cavity in the deck for positioning the cassette is provided by a pair of side walls 95 extending upward from the deck plate 82, and joined to a top plate 96. The cassette is received within this cavity as shown in FIGS. 5 and 6, and the toothed configuration of the drive, essentially flush with the cassette surface, allows a single motion loading or unloading of the cassette, merely by inserting it into the cavity or withdrawing it therefrom. A latch lever 97 is pivoted to the upper plate 96, and is urged by a spring 98 to engage within a notch 99 formed in the cassette body, to position the cassette within the cavity, holding it against a pair of spring loaded ejector pins 100 (FIG. 5). A locator pin 102 may also be provided to enter a corresponding small hole 103 in the edge of the cassette, to provide additional lateral positioning if necessary.

The cassette may be inserted merely by pushing it past the spring loaded latch arm 97 until it is in proper position, where this arm will enter the notch 99. By pressing down on the release button 105, the latch arm 97 can be released and the ejector pins 100 will move the cassette partially out of the cavity, away from the playing position, where it can be grasped and removed. The pilot parts of the drive and driven hubs are either eliminated or made of very short length such that the cassette can enter the cavity without any real interference, after which the force of the latch arm 97 will bring the hubs into centered engagement.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A magnetic cassette drive comprising, a hollow cassette housing a movable magnetic recording media, a driven hub rotatably supported in said cassette and connected to move the media, a driven face on said driven hub including a plurality of circularly arranged radially extending and axially facing teeth, said teeth having undercut driving faces, a drive hub separate from said cassette and having a drive face which is the complement of said driven hub, means connected to rotate said drive hub such that its undercut driving faces are foremost in the direction of rotation; and means supporting said cassette and said drive hub to bring said faces into contact to cause a locking engagement of the hubs during rotation thereof.

2. A cassette drive as defined in claim 1, including first and second interacting locating means of the respective said hubs to align said faces for complete meshing of said teeth.

3. A cassette drive as defined in claim 1 wherein the media is a disc of recording material retained in said cassette and connected to rotate with said driven hub.

4. A cassette drive as defined in claim 1, wherein the media is a length of recording tape in said cassette and arranged to be moved lengthwise in response to rotation of said driven hub.

5. A drive for transporting a magnetic recording media contained in a cassette past a transducer, said drive comprising a deck, a drive hub mounted on said deck, said drive hub having a disc face with a plurality of radially extending teeth thereon undercut in one direction and arranged in a circle, a cassette containing a quantity of magnetic recording media, a driven hub attached to said media to move it through rotation of said driven hub, said cassette having an opening aligned with said driven hub, said driven hub having a disc face located in said opening substantially flush with the outer surface of said cassette, a plurality of radially extending teeth on said driven hub arranged in a circle and undercut in complementary fashion to said drive hub, means cooperating with said cassette and said drive hub to guide said disc faces into aligned contact, and drive means connected to rotate said drive hub in a direction to interengage the undercut sides of said teeth whereby said undercut teeth will mesh and will automatically draw said disc faces firmly together upon rotation of said drive hub to advance said media without causing said drive hub to enter into said cassette.

* * * * *